United States Patent [19]
Collins

[11] Patent Number: 6,037,863
[45] Date of Patent: Mar. 14, 2000

[54] LOW TIRE SENSING AND WEIGHT TRANSFER SYSTEM

[76] Inventor: Joe H. Collins, 87749 Collins La., Springfield, Oreg. 97478

[21] Appl. No.: 09/390,574

[22] Filed: Sep. 3, 1999

Related U.S. Application Data

[60] Provisional application No. 60/099,231, Sep. 4, 1998.
[51] Int. Cl.$^7$ .................................................. B60C 23/00
[52] U.S. Cl. .......................... 340/443; 340/442; 340/431; 73/146.2; 200/61.22
[58] Field of Search .................... 340/442, 443, 340/431; 73/146, 146.2; 200/61.22

[56] References Cited

U.S. PATENT DOCUMENTS

| | | | |
|---|---|---|---|
| 2,957,058 | 10/1960 | Trott | 340/443 |
| 3,614,122 | 10/1971 | Herren | 340/443 |
| 4,173,011 | 10/1979 | Gibson . | |

*Primary Examiner*—Daniel J. Wu
*Attorney, Agent, or Firm*—Robert E. Howard

[57] ABSTRACT

A vehicle, such as a trailer, having a low tire warning and weight transfer system. The trailer has tandem wheel sets located on each side. The two tires of each tandem wheel set are each rotatably attached to a walking beam assembly which, in turn is attached to the trailer. The walking beam assembly has a horizontal walking beam that is substantially parallel to the ground when both tires of the adjacent wheel set are fully inflated. Walking beam stops are located on the trailer body adjacent each end of the walking beam. At least part of the stops intersect the vertical plane of the adjacent walking beam at a site above and/or below the beam. When one of the tires of a tandem wheel set becomes at least partially deflated, at least one end of the same side walking beam comes into contact with the adjacent stop, which prevents further movement of the walking beam assembly and shifts weight to the other, fully inflated tire. Upon contact of the walking beam end with the stop, a low tire signalling device is actuated.

11 Claims, 3 Drawing Sheets

LOW TIRE SENSING AND WEIGHT TRANSFER SYSTEM

CROSS-REFERENCE TO RELATED APPLICATIONS

This application claims the benefit of U.S. Provisional application No. 60/099,231 filed Sep. 4, 1998, the entire contents of which are hereby incorporated by reference.

BACKGROUND OF THE INVENTION

This invention relates to a low tire sensing and weight transfer system for use with a trailer or truck.

A copending patent application of the present inventor filed of even date herewith (which said copending application claims the benefit of Provisional patent application No. 60/099,195 filed Sep. 4, 1998) describes a transport vehicle, such as a trailer, having a mechanism for lowering the rear portion of the cargo deck thereof to facilitate loading cargo, such as a motorized vehicle. The entire contents of said copending application are hereby incorporated by reference.

The vehicle cargo deck lowering mechanism of said copending application comprises a running gear consisting of a single axle rotatably attached to the deck frame, an axle drop attached to both ends of the axle, walking beams attached to the axle drops, and two pneumatic tires attached to each walking beam by axle stubs or spindles.

If one of the pneumatic tires of a tandem set becomes low during operation of the transport vehicle, undue wear quickly occurs in that tire. Therefore, it would be desirable to have a low tire sensing device to enable the vehicle operator to quickly detect the low tire situation and take steps to correct it.

It would also be desirable to relieve the forces causing undue wear on the low tire until such time as it can be safely repaired or replaced.

SUMMARY OF THE INVENTION

It is an object of this invention to provide a simple, inexpensive and rugged system for low tire detection that does not require the use of expensive, delicate switching.

It is a further object of this invention to provide a simple, inexpensive and rugged system for transferring all or part of the weight from a low tire to the fully inflated tire in a tandem wheel tire set of a trailer or truck.

This invention provides a low tire sensing device and weight transfer device for use with a tandem wheel set type transport vehicle of the type described in said copending application.

The device of this invention provides contact areas formed by the forward and rearward ends of the walking beams and adjacent frame protrusions. The walking beam ends and frame protrusions are spaced vertically apart a distance such that they engage when the air pressure in one of the tires of the tandem set becomes low and before significant tire damage results.

The low tire sensing device of this invention is comprised of an electrically isolated walking beam in which the walking beam ends are spaced vertically above and/or below trailer frame protrusions such that when a tire becomes low at least one of the walking beam ends comes into contact with at least one of such frame protrusions, thereby grounding the walking beam with the frame. A relay, supplied with electrical power, is energized by such grounding. This relay, in turn, energizes a warning signal located in the operator's cab.

The weight transfer aspect of this invention utilizes the frame protrusion which contacts the walking beam and supports it upon the walking beam coming into engagement therewith due to a low tire condition.

DESCRIPTION OF PREFERRED EMBODIMENTS OF THE INVENTION

Figure 1:
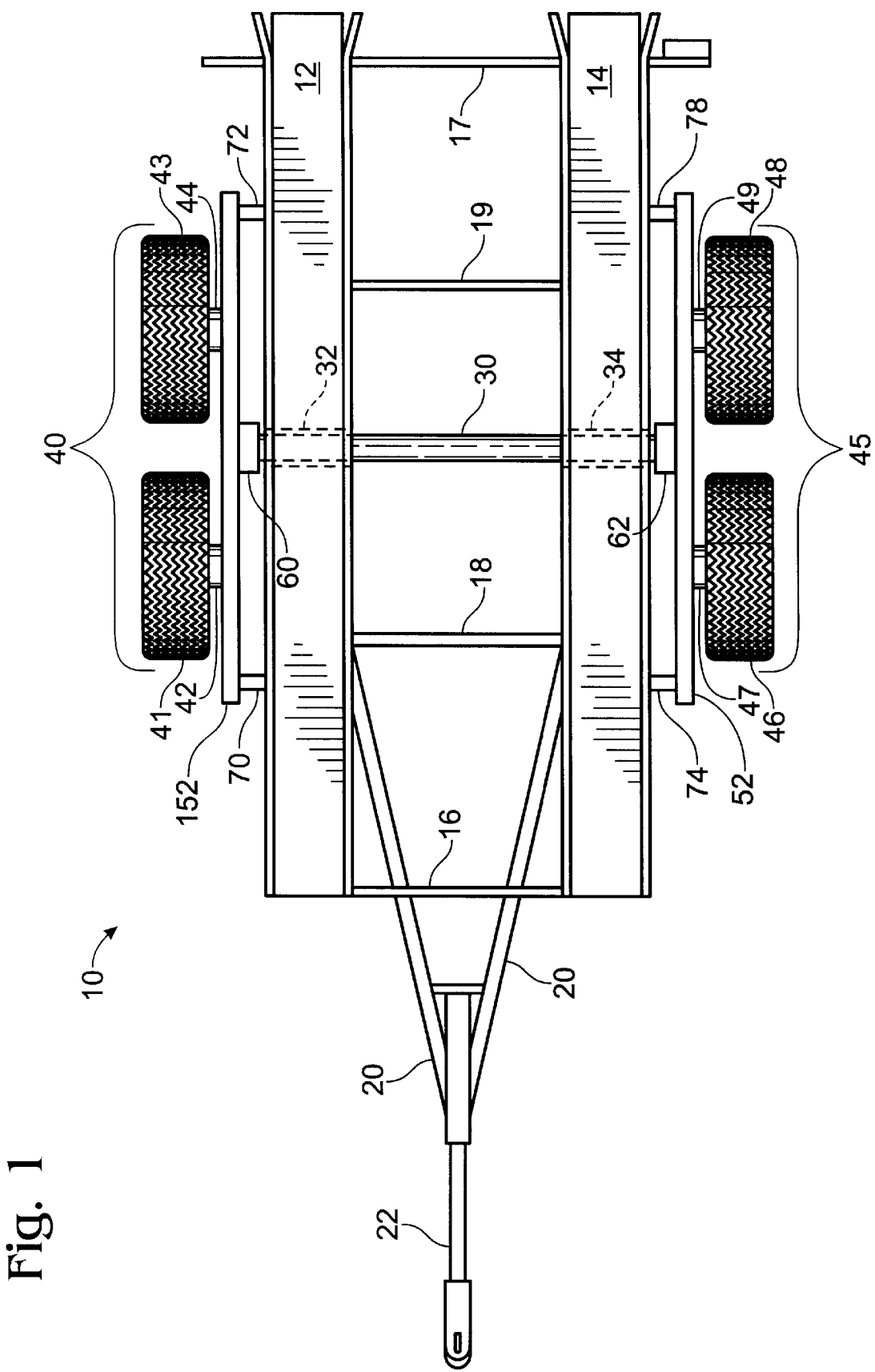
FIG. 1 is a top plan view of the trailer of this invention.

The invention will be described relative to a transport vehicle that is a trailer. However, the invention also applies to other transport vehicles, such as a truck.

Trailer 10 has a frame comprised of longitudinally extending right and left channel members or ramps 12 and 14, front cross member 16, rear cross member 17, front intermediate cross member 18 and rear intermediate cross member 19, cross members 16–19 being substantially perpendicular to ramps 12 and 14. Cross members 16-19 are fixedly attached to ramps 12 and 14, such as by welding, to form a rigid trailer frame.

Although ramps 12 and 14 can be part of the trailer frame, as an alternative right and left longitudinal frame members rigidly affixed to cross members 16-19 can be used to form the trailer frame with ramps 12 and 14, or other decking, attached to such longitudinal and cross frame members.

Ramps 12 and 14 have widths and spacing between them which are adapted to receive the right and left tires of a motor vehicle to be transported.

Although motor vehicle tire receiving ramps 12 and 14 are preferred as the transporting deck or bed of the trailer 10, other deck configurations may be used, such as a flat bed extending between the two longitudinal sides of the trailer or truck.

V-shaped towing frame member 20 extends from the front end of trailer 10, and is suitably attached (such as by welding) to the trailer frame at an appropriate location.

Tow bar 22 is attached to V-shaped towing frame member 20 as shown. Tow bar 22 is used for attaching trailer 10 to a towing vehicle, such as a truck, in a manner well known in the art.

Lowering axle 30 is rotatably attached to ramps 12 and 14 by right and left bearing assemblies 32 and 34, respectively, which said bearing assemblies are firmly attached to the underside of ramps 12 and 14.

Trailer 10 has right and left tandem wheel sets 40 and 45. Right tandem wheel set 40 is comprised of pneumatic tires 41 and 43, and left tandem wheel set 45 is comprised of pneumatic tires 46 and 48.

Wheels 41, 43, 46, and 48 are rotatably attached to the outer ends of stub axle assemblies or spindles 42, 44, 47, and 49, respectively. During movement of the trailer 10, wheels 41, 43, 46, and 48 rotate about spindles 42, 44, 47, and 49.

The inner ends of spindles 42 and 44 are fixedly attached to a right walking beam assembly and the inner ends of spindles 47 and 49 are fixedly attached to a left walking beam assembly. Only the left walking beam assembly 50 is fully illustrated; see FIG. 2.

Left walking beam assembly 50 is comprised of a horizontal walking beam 52, vertical structural members 53, 54, and 55, and angled structural members 56 and 57, all joined as shown.

The right walking beam assembly is identical to left walking beam assembly 50, although the mirror images thereof. Only right walking beam 152 of the right walking beam assembly is shown in the drawings. Right walking beam 152 corresponds to left walking beam 52.

Figure 2:
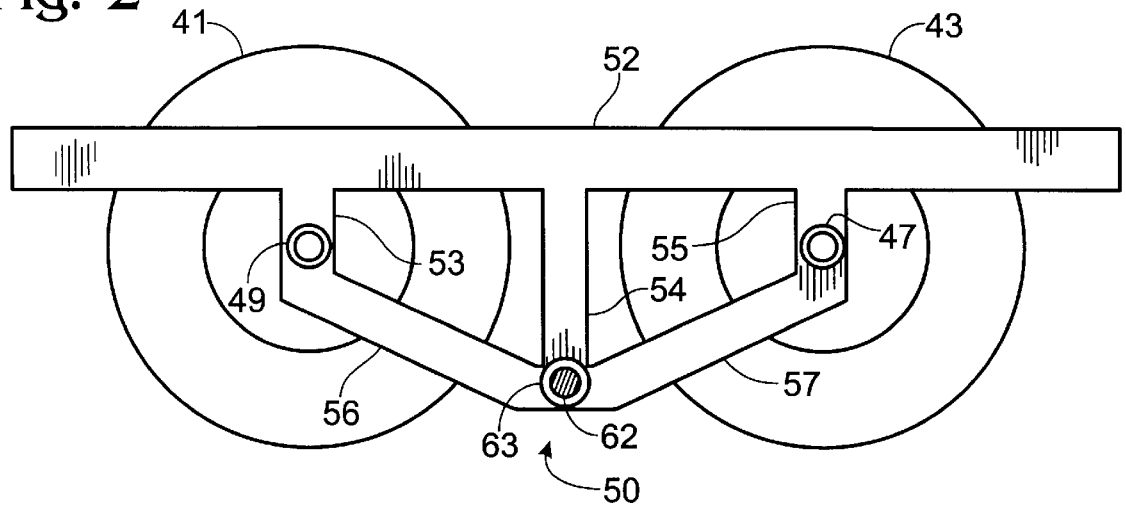
FIG. 2 is a side elevation view of the walking beam and tandem tire assembly of the invention.

Lowering axle 30 is pivotally attached to the right and left walking beam assemblies by pivot pins 60 and 62, respectively. Walking beams 52 and 152 are electrically isolated from the frame of trailer 10 by surrounding pivot pins 60 and 62 with bushings made of electrical current insulating material (such as ultra high molecular weight polyethylene), only insulating bushing 63 associated with pivot pin 62 being shown (FIG. 2).

The operating relationship between trailer lowering axle 30 and walking beam assemblies 50 and 150, and the operating relationship between trailer lowering axle 30 and the mechanism for rotating axle 30, do not form a part of the present invention; these are described in detail in applicant's copending application referred to above and incorporated herein by reference.

Walking beam stops (frame protrusions) 70 and 72 extend outwardly from the right side of trailer 10 adjacent the ends of right walking beam 152, and walking beam stops 74 and 78 extend outwardly from the left side of trailer 10 adjacent the ends of left walking beam 52, as shown.

Each walking beam stop can be L-shaped with a vertical leg extending downward from an adjacent frame member and a horizontal ledge extending outward from the lower end of the vertical leg. Thus, walking beam stop 74 is shown in FIGS. 5 and 6 as being comprised of a vertical leg 75 and a horizontal ledge 76.

Alternatively, walking beam stops 70, 72, 74, and 78 can merely be extensions of trailer frame cross members 18 and 19.

Although the walking beam stops must intersect the vertical plane occupied by the respectively adjacent walking beams in order to make contact therewith in the event of a low tire situation, they may be located above and/or below the horizontal plane passing through the walking beams in the full tire inflation mode. Where the stops are located both above and below a walking beam end, it is not required to have any stops at the other end of the walking beam. In the drawings of the preferred embodiment the walking beam stops are shown as being located below the horizontal plane of the walking beams and at both ends thereof.

Figure 3:
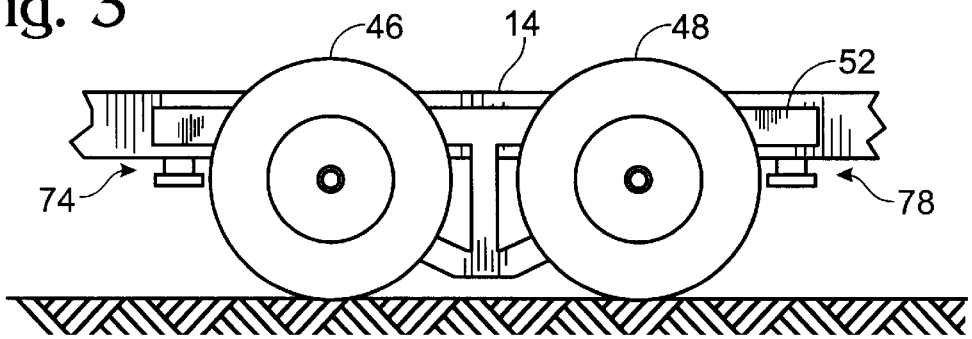
FIG. 3 is a side elevation view of the low tire sensing and weight transfer system of the trailer of this invention showing both tires in their normal, inflated configuration.
Figure 5:
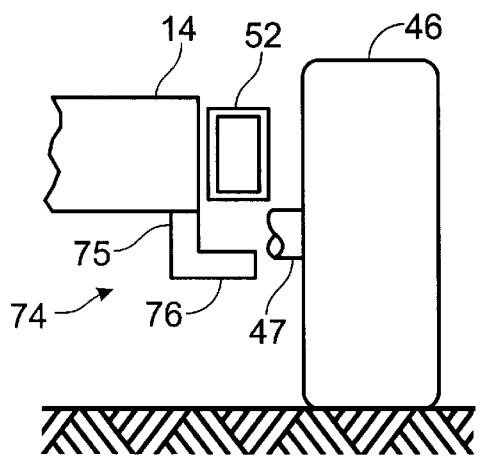
FIG. 5 is a partial front view of the low tire sensing and weight transfer system showing the trailer tires in their normal, inflated configuration.
Figure 6:
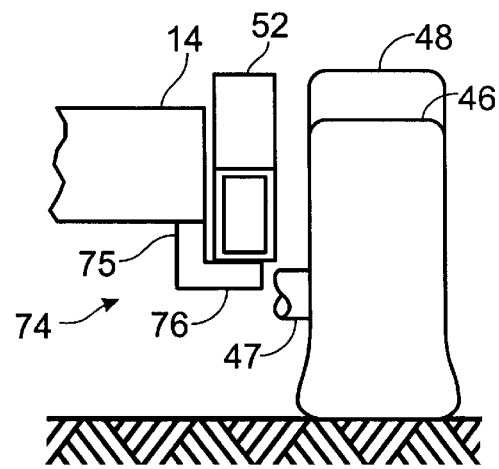
FIG. 6 is a partial front view of the low tire sensing and weight transfer system showing the front tire being partially deflated.

As can be seen by reference to FIGS. 3 and 5, the forward and rearward ends of walking beam 52 are located above, and out of contact with, walking beam stops 74 and 78, respectively, when both tires 46 and 48 are properly inflated.

Figure 4:
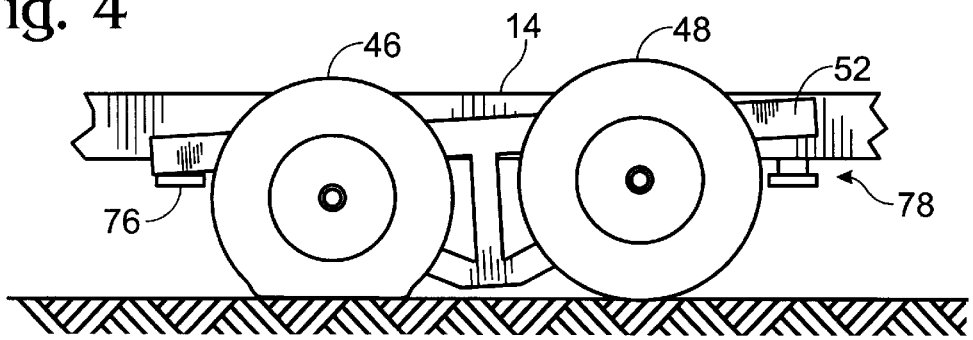
FIG. 4 is a side elevation view of the low tire sensing and weight transfer system of this invention showing one of the tires in a partially deflated configuration.

FIGS. 4 and 6 show what happens when front left tire 46, for example, loses air pressure. Upon tire 46 losing air pressure, the front end of left side walking beam 52 drops downward, and, if sufficient air pressure is lost, will come into contact with ledge 76 of walking beam stop 74, as shown.

Contact of walking beam 52 with ledge 76 of walking beam stop 74 accomplishes two purposes. First, contact causes electrical connection (grounding) between walking beam 52 and the frame of trailer 10, as described below, which can be used to actuate an alarm to alert the operator of a problem. Secondly, ledge 76 of walking beam stop 74 prevents further downward movement by walking beam 52, thereby shifting progressively more of the weight from left front tire 46 as it deflates to fully inflated left rear tire 48, which prevents damage to tire 46 and provides the operator with time to move the trailer to a safe location for tire repair. If left front tire 46 fully deflates, all of the weight formerly carried by tire 46 is shifted to left rear tire 48.

Figure 7:
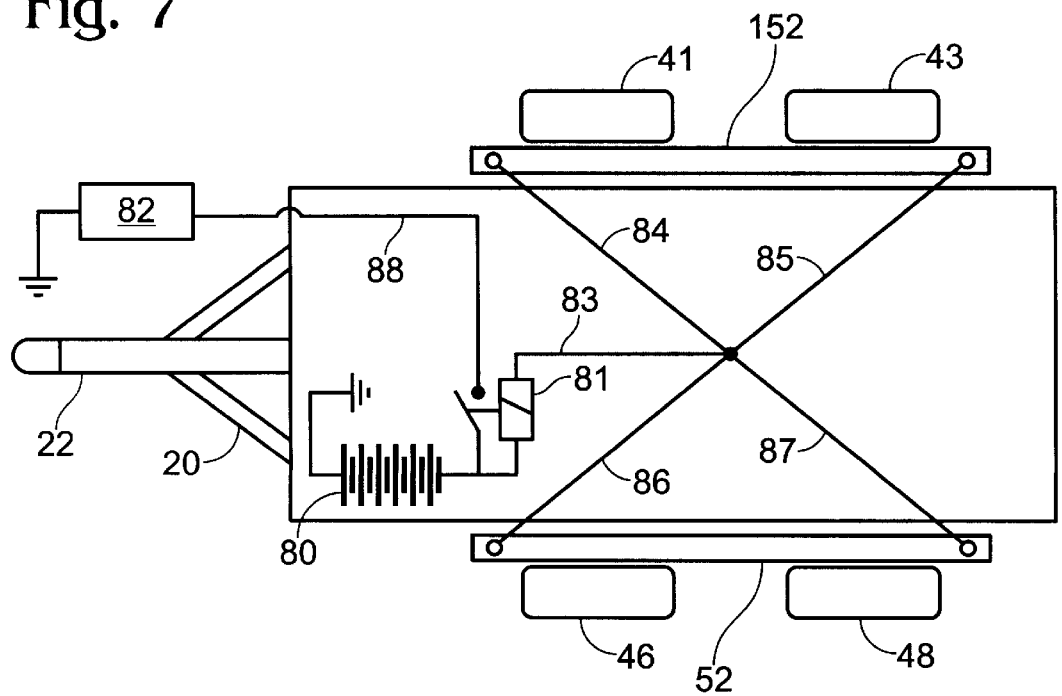
FIG. 7 is a schematic view of the electrical circuit used with the low tire sensing device of this invention.

FIG. 7 is a schematic view of an electrical circuit that can be used to initiate an alarm upon a low tire causing one of the ends of either walking beam 52 or 152 to sag and come into contact with one of the grounded walking beam stops 70, 72, 74, or 78, it being understood that the frame of trailer 10 and walking beams 52 and 152 are metal and conductive.

As can be seen, the circuit comprises a battery 80, a relay switch 81, and an alarm signalling device 82, such as a light or buzzer. Alarm 82 is located within the cab of the vehicle towing trailer 10.

Wires 83 and 84 connect the forward end of walking beam 152 with relay switch 81; wires 83 and 85 connect the rearward end of walking beam 152 with relay switch 81; wires 83 and 86 connect the forward end of walking beam 52 with relay switch 81; and wires 83 and 87 connect the rearward end of walking beam 52 with relay switch 81. Wire 88 connects relay switch 81 to alarm 82.

Instead of wires being attached to the forward and rearward end of each walking beam, shown as wires 84–87 in FIG. 7, a single wire may be attached to a mid-portion of each walking beam since the entire walking beam is conductive.

Since walking beams 52 and 152 are electrically insulated from the frame of trailer 10, as discussed above, the circuit between them and relay switch 81 remains open when both tires of the adjacent tandem wheel set are fully inflated. Upon one of the tires 41, 43, 46, or 48 becoming deflated, the adjacent end of walking beam 52 or 152 sags toward and comes into contact with the adjacent walking beam stop 70, 72, 74, or 78, all of which are grounded. Upon such contact, the circuit between that walking beam and relay switch 81 is closed, and relay switch 81 closes to open communication between battery 80 and alarm 82, thereby alerting the operator of the towing vehicle that one of the tires of trailer 10 is low.

Instead of insulating the entire walking beam from the frame of trailer 10 by use of insulating pivot pin bushings, as discussed above, an electrically conducting plate can be placed at each end of both walking beams 52 and 152, the plates being insulated from the walking beam by suitable electrical insulating material, such as ultra high molecular weight polyethylene, located between such plate and walking beam end. In such a configuration, wires 84, 85, 86, and 87 would be connected to the respective conductive plates.

While preferred embodiments of the invention have been described, variations to various features can be made which fall within the spirit of the invention and within the scope of the appended claims.

The invention claimed is:

1. A transport vehicle with a cargo deck comprising:

said cargo carrying deck having first and second sides, said deck having a supporting frame comprised of longitudinal frame members and cross frame members;

a first tandem wheel set attached to said vehicle adjacent said first side of said deck and a second tandem wheel set attached to said vehicle adjacent said second side of said deck, each of said first and second wheel sets being comprised of first and second pneumatic tires, said first and second tires of each said wheel set being rotatably attached to an adjacent walking beam assembly having a walking beam that is substantially parallel to the ground when said first and second tires are both fully inflated, said walking beams being electrically insulated from said frame;

at least one electrically grounded walking beam stop attached to said vehicle adjacent at least one end of each said walking beam, at least part of each said stop intersecting the vertical plane of said adjacent walking beam at a site located above and/or below said adjacent walking beam end when said first and second tires are both fully inflated, said site being sufficiently close to said walking beam end that said walking beam end contacts said stop upon at least one of said tires becoming at least partially deflated; and a signalling device that is actuated when one of said walking beam ends contacts an adjacent walking beam stop.

2. The vehicle of claim 1 wherein said signalling device comprises an electric power source, relay, and electric signal, said power source, relay, and electric signal being electrically connected, said relay being also electrically connected to said walking beams, said relay being actuated to open electrical communication between said power source and said signal upon contact of one of said walking beam ends with an adjacent walking beam stop.

3. The vehicle of claim 2 wherein said relay is electrically connected to said walking beams at a point adjacent at least one end thereof.

4. The vehicle of claim 2 wherein said relay is electrically connected to said walking beams at a mid-point thereof.

5. The vehicle of claim 2 wherein said walking beams have metal plates connected thereto at each site that is positioned to come into contact with a walking beam stop, said plates having an electrical insulating layer interposed between said plates and said walking beams, said relay being electrically connected to each of said plates.

6. The vehicle of claim 1 wherein said walking beam stops are adapted to resist further movement of a walking beam end after contact therewith.

7. The vehicle of claim 1 wherein said walking beam stops are located below adjacent walking beam ends when said tires are fully inflated.

8. The vehicle of claim 1 wherein said walking beam stops are located above adjacent walking beam ends when said tires are fully inflated.

9. The vehicle of claim 1 wherein said walking beam stops are located both above and below said walking beams at at least one end thereof when said tires are fully inflated.

10. The vehicle of claim 1 wherein said walking beam stops are extensions of cross frame members.

11. The vehicle of claim 1 wherein each of said walking beam stops are L-shaped with a vertical leg thereof being attached to said frame and a horizontal ledge extending from said vertical leg into intersection with the vertical plane of said walking beam.

* * * * *